United States Patent
Kutter et al.

(10) Patent No.: US 11,746,856 B2
(45) Date of Patent: Sep. 5, 2023

(54) SHIFTABLE PLANETARY GEAR TRAIN

(71) Applicant: ZF Friedrichshafen AG, Friedrichshafen (DE)

(72) Inventors: Fabian Kutter, Kressbronn (DE); Matthias Horn, Tettnang (DE); Stefan Beck, Eriskirch (DE); Johannes Kaltenbach, Friedrichshafen (DE); Uwe Griesmeier, Markdorf (DE); Thomas Martin, Weissensberg (DE); Peter Ziemer, Tettnang (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/605,707

(22) PCT Filed: Mar. 4, 2020

(86) PCT No.: PCT/EP2020/055631
§ 371 (c)(1),
(2) Date: Oct. 22, 2021

(87) PCT Pub. No.: WO2020/216505
PCT Pub. Date: Oct. 29, 2020

(65) Prior Publication Data
US 2022/0163097 A1    May 26, 2022

(30) Foreign Application Priority Data
Apr. 23, 2019 (DE) ...................... 10 2019 205 748.9

(51) Int. Cl.
*F16H 3/54* (2006.01)
*F16H 63/30* (2006.01)

(52) U.S. Cl.
CPC ....... *F16H 3/54* (2013.01); *F16H 2063/3093* (2013.01); *F16H 2200/0034* (2013.01);
(Continued)

(58) Field of Classification Search
CPC ..... F16H 2200/2064; F16H 2200/2094; F16H 3/54; F16H 2063/3093; F16H 57/082; F16D 11/14
See application file for complete search history.

(56) References Cited

U.S. PATENT DOCUMENTS 4,063,470 A * 12/1977 Kelbel ................. F16H 3/54
475/320
5,643,129 A * 7/1997 Richardson ........... B60K 23/08
475/248
(Continued)

FOREIGN PATENT DOCUMENTS

DE  102004014081  10/2005
DE  102014208794  11/2015
(Continued)

OTHER PUBLICATIONS

International Search Report (English Tranlsation) PCT/EP2020/055631, dated Jun. 30, 2020. (2 pages).
(Continued)

*Primary Examiner* — Ernesto A Suarez
*Assistant Examiner* — Lillian T Nguyen
(74) *Attorney, Agent, or Firm* — Dority & Manning, P.A.

(57) ABSTRACT

A shiftable planetary transmission (1) includes a planet carrier (2), a plurality of planet gears (3) rotatably arranged at the planet carrier (2), a sun gear (4), and a ring gear (5). The sun gear (4) and the ring gear (5) mesh with the planet gears (3). The planet carrier (2) includes at least one connecting element (6), which is axially displaceable therein. The at least one connecting element (6), on a first side of the planet carrier (2), is at least indirectly connected to an actuator (7) and, on a second side of the planet carrier (2), is at least indirectly connected to a first dog element (8). The first dog element (8) is displaceable, by an actuator actuation, between a first shift position and at least a second shift
(Continued)

position due to an axial displacement of the at least one connecting element (6) in the planet carrier (2).

12 Claims, 2 Drawing Sheets

(52) U.S. Cl.
CPC ............... *F16H 2200/2035* (2013.01); *F16H 2200/2064* (2013.01); *F16H 2200/2094* (2013.01)

(56) References Cited

U.S. PATENT DOCUMENTS

| | | | |
|---|---|---|---|
| 5,711,740 A * | 1/1998 | Bakowski | F16H 3/54 475/303 |
| 7,682,281 B2 | 3/2010 | Ziemer | |
| 10,648,517 B2 | 5/2020 | Mastie et al. | |
| 2015/0068344 A1 * | 3/2015 | Ziemer | F16D 11/14 74/473.36 |
| 2017/0144527 A1 | 5/2017 | Ziemer | |
| 2017/0146098 A1 | 5/2017 | Ziemer | |

FOREIGN PATENT DOCUMENTS

| | | | |
|---|---|---|---|
| DE | 102014208799 | | 11/2015 |
| DE | 102014215287 | | 2/2016 |
| DE | 102017113579 | | 12/2017 |
| DE | 102017111051 B3 * | | 6/2018 |
| WO | WO 2016/020127 | | 2/2016 |
| WO | WO-2017089144 A1 * | 6/2017 | ............. B23Q 5/142 |

OTHER PUBLICATIONS

German Search Report DE 10 2019 205 748.9, dated Jan. 10, 2020. (14 pages).

* cited by examiner

SHIFTABLE PLANETARY GEAR TRAIN

CROSS-REFERENCE TO RELATED APPLICATIONS

The present application is related and has right of priority to German Patent Application No. 102019205748.9 filed in the German Patent Office on Apr. 23, 2019 and is a nationalization of PCT/EP2020/055631 filed in the European Patent Office on Mar. 4, 2020, both of which are incorporated by reference in their entirety for all purposes.

FIELD OF THE INVENTION

The invention relates generally to a shiftable planetary transmission including a planet carrier, multiple planet gears rotatably arranged at the planet carrier, and a sun gear and a ring gear, each of which meshes with the planet gears.

BACKGROUND

For example, DE 10 2004 014 081 A1 discloses a shiftable planetary transmission including multiple planetary gear sets, at least two friction-locking shift elements for engaging various power paths into a power flow, and multiple form-locking shift elements for setting various gear stages in the power paths. The friction-locking shift elements and the form-locking shift elements are arranged between shafts of the planetary gear sets, a housing, and a transmission input shaft and a transmission output shaft in such a way that gear step changeovers are implementable at least in a lower gear step range via the friction-locking shift elements without an interruption of tractive force. At least one of the friction-locking shift elements is designed as a clutch. The form-locking shift elements, the friction-locking shift elements, and the planetary gear sets are positioned in the housing and bringable into an operative connection in such a way that an actuation of the form-locking shift elements is implementable without being acted upon by rotating components.

SUMMARY OF THE INVENTION

Example aspects of the present invention provide a compact, shiftable planetary transmission.

A shiftable planetary transmission according to example aspects of the invention includes a planet carrier, multiple planet gears rotatably arranged at the planet carrier, and a sun gear and a ring gear. Each of the sun and ring gears meshes with the planet gears. The planet carrier includes at least one connecting element, which is axially displaceable therein and, on a first side of the planet carrier, is at least indirectly connected to an actuator and, on a second side of the planet carrier, is at least indirectly connected to a first dog element. The first dog element is displaceable, by an actuator actuation, between a first shift position and at least a second shift position due to an axial displacement of the at least one connecting element in the planet carrier.

Consequently, the at least one connecting element is guided axially through the planet carrier and is configured for displacing the first dog element, which is located on the second side of the planetary transmission and is at least indirectly connected to the at least one connecting element, between the first shift position and at least the second shift position in accordance with the actuator, which is located on the first side of the planetary transmission and is at least indirectly connected to the at least one connecting element. Consequently, an action by the planet carrier is implemented by the at least one connecting element, and so a compact, shiftable planetary transmission is formed.

An at least indirect connection of two components is to be understood to mean that the two components can be directly connected to each other, or that further elements are arranged between the two components, and so the two components are indirectly connected to each other via the further elements.

Preferably, the first dog element is designed in the shape of a ring. Consequently, the first dog element is designed as a dog ring. A dog ring is to be understood to be a ring-shaped shift element, which interacts with at least one further element to form a form-locking connection. Consequently, the dog ring is designed as a shift element that is shiftable between at least two shift positions and, thereby, implements at least two different ratios at the planetary transmission, wherein the planetary transmission is shiftable between the at least two ratios.

It is preferred when the at least one connecting element is designed in the shape of a pin or a rod. Consequently, the at least one connecting element is designed as a selector pin. A selector pin is a cylindrical component that is preferably made of a metal. In particular, the at least one selector pin is made of solid material or is designed to be hollow-cylindrical and, thereby, weight-reduced.

Preferably, the first dog element includes an internal toothing, which, in a first shift position, is form-lockingly connected to a toothing at a second dog element and, in a second shift position, is form-lockingly connected to a toothing at a third dog element. In particular, the first toothing at the second dog element and the second toothing at the third dog element are designed as external toothings. A toothing is to be understood to be a structure that is form-lockingly connected to a structure designed to be corresponding or complementary thereto. The external toothing is formed at an outer circumferential surface of the particular component, wherein the internal toothing is formed at an inner circumferential surface of the particular component.

For example, the second dog element or the third dog element is rotationally fixed to the sun gear or to the ring gear. According to a further example, the second dog element is rotationally fixed to the sun gear or to the ring gear. In this case, the planet carrier is rotationally fixed to the sun gear or to the ring gear in the first shift position. According to a further example, the third dog element is rotationally fixed to the sun gear or to the ring gear. In this case, the planet carrier is rotationally fixed to the sun gear or to the ring gear in the second shift position. Alternatively, the second dog element is rotationally fixed to the sun gear and the third dog element is rotationally fixed to the ring gear. In this case, the planet carrier is rotationally fixed to the sun gear in the first shift position and to the ring gear in the second shift position. It is also conceivable to rotationally fix the second dog element to the ring gear and the third dog element to the sun gear. In this case, the planet carrier is rotationally fixed to the ring gear in the first shift position and to the sun gear in the second shift position.

According to one preferred example embodiment of the invention, the first dog element is decoupled from the second dog element and the third dog element in a third shift position. Consequently, in the third shift position, the first dog element is in an intermediate position, which decouples the planet carrier from the second dog element and the third dog element and, thereby, allows these to freely rotate.

In particular, the third shift position is arranged axially between the first shift position and the second shift position. This yields the advantage that a shift can take place from the third shift position (neutral position) into the first or second shift position depending on the direction of the axial displacement of the first dog element. This shortens, in particular, the shift stroke and the shift time.

Preferably, the first dog element includes an external toothing, which engages and is axially guided in an internal toothing of the planet carrier. For example, the external toothing at the first dog element can include only one tooth, which is configured for form-lockingly interacting with the tooth gap or groove, which is designed to be corresponding or complementary thereto, at an axial section of the planet carrier in order to implement a controlled axial displacement of the first dog element and prevent a rotation of the first dog element. Alternatively, the external toothing can be circumferentially formed at the first dog element and include a plurality of teeth and tooth gaps, which form-lockingly interact with an internal toothing, which is designed to be corresponding or complementary thereto, at an axial section of the planet carrier. During an actuation of the actuator, the first dog element axially slides, with its external toothing, in the internal toothing at the planet carrier between the at least two shift positions. Preferably, the actuator is electromechanically actuatable.

Preferably, multiple connecting elements are accommodated at the planet carrier, wherein one connecting element is arranged in the circumferential direction between every two planet gears at the planet carrier. Consequently, connecting elements and planet gears are arranged in alternation in the circumferential direction at the planet carrier. In particular, a particular connecting element is arranged and axially guided in an axial recess at the planet carrier provided therefor, wherein a particular planet gear is rotatably mounted at the planet carrier via a particular planetary gear pin.

According to one preferred example embodiment of the invention, the at least one connecting element is connected on the first side of the planet carrier to a disk, wherein the disk is indirectly connected to the actuator via a sliding or gear change sleeve and a selector fork. Consequently, the actuator, upon actuation, displaces a selector fork, which engages into a sliding sleeve, wherein the sliding sleeve is connected to the disk and, via the disk, actuates the at least one connecting element. In particular, a plurality of connecting elements is accommodated at the disk, uniformly distributed over the circumference, and so all connecting elements are simultaneously axially displaced in the planet carrier via the disk. Preferably, the sliding sleeve is axially movably accommodated at a shaft. It is preferred when the disk is curved in the shape of a cup and axially comes to rest against the sliding sleeve.

For example, the at least one connecting element is form-lockingly accommodated in a particular recess at the disk. In particular, the at least one connecting element is compressed with the disk.

It is preferred, furthermore, when the at least one connecting element is form-lockingly arranged at the first dog element via a snap ring. Preferably, the snap ring is form-lockingly arranged in a groove at the particular connecting element provided therefor and axially comes to rest against the first dog element.

BRIEF DESCRIPTION OF THE DRAWING

One preferred exemplary embodiment of the invention is explained in greater detail in the following with reference to the drawings, in which.

DETAILED DESCRIPTION

Figure 1:
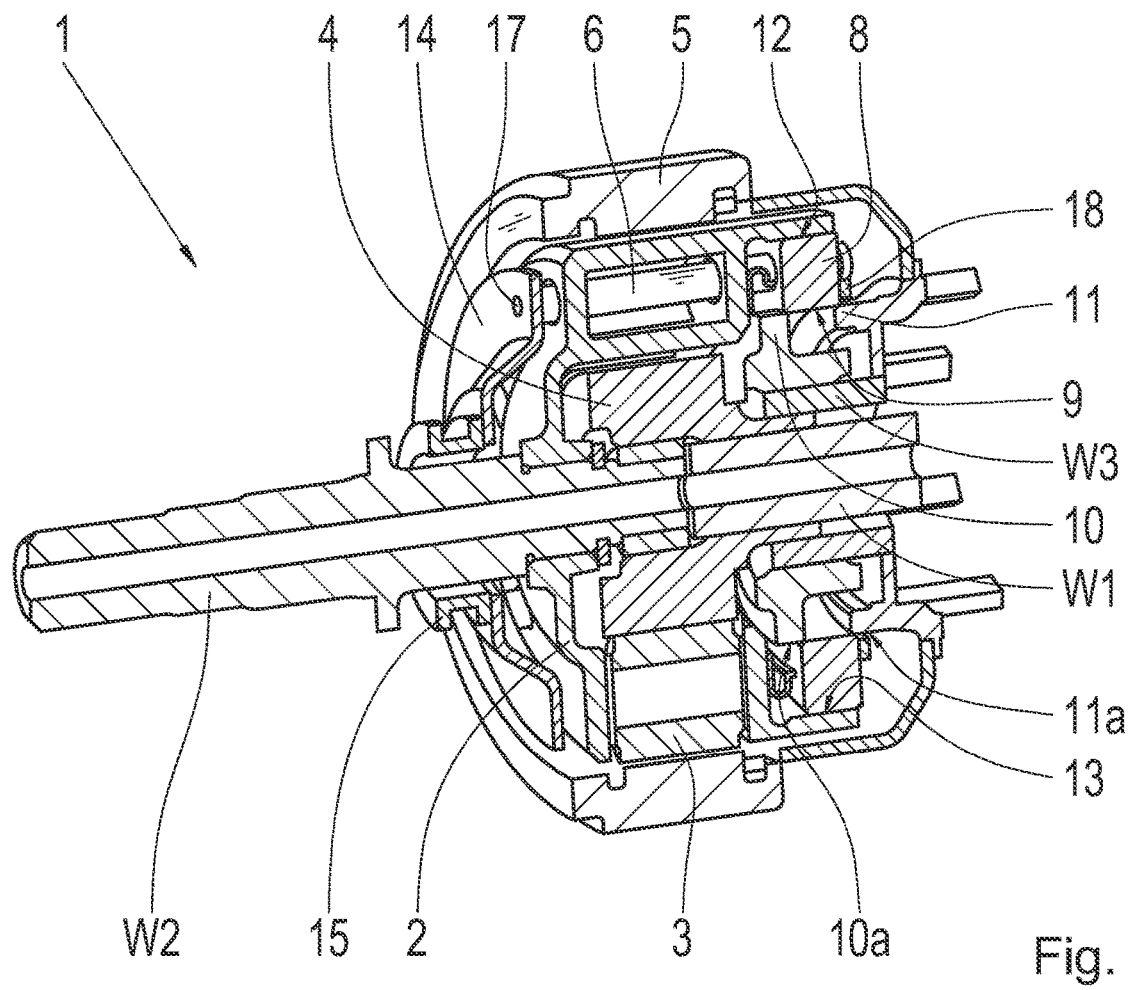
FIG. 1 shows a simplified perspective schematic of a planetary transmission according to example aspects of the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 2:
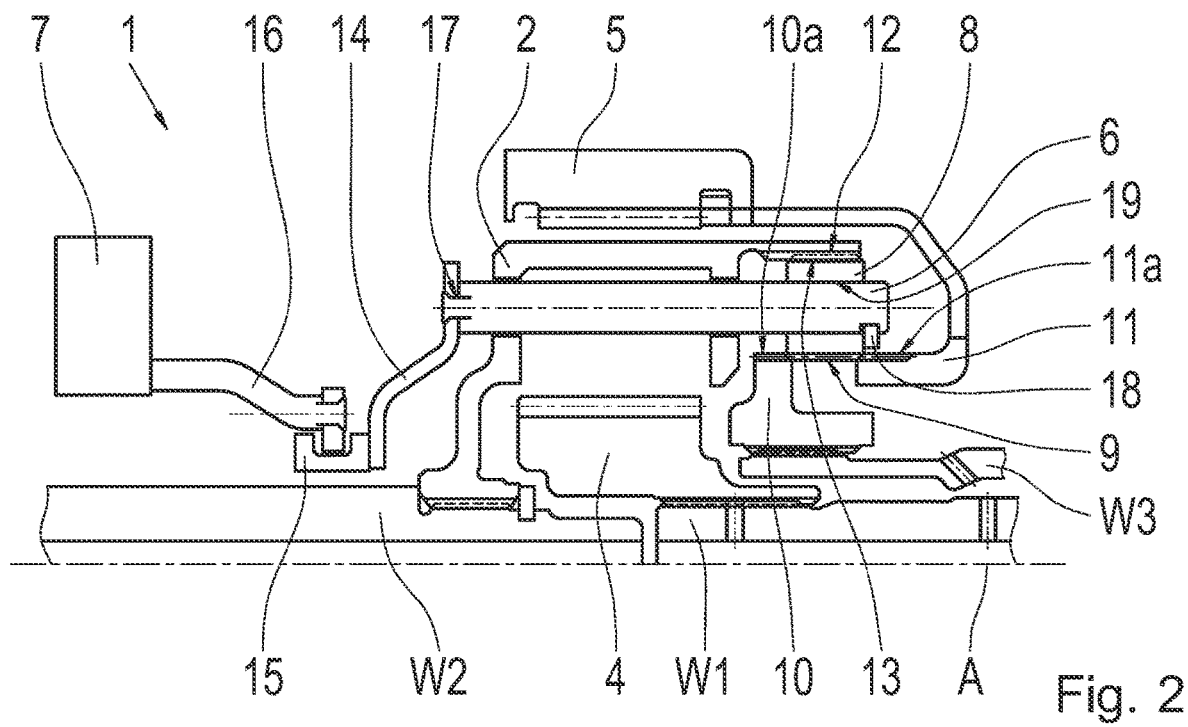
FIG. 2 shows a simplified half-section schematic of the planetary transmission according to example aspects of the invention.

According to FIG. 1 and FIG. 2, a shiftable planetary transmission 1 according to example aspects of the invention includes a planet carrier 2, multiple planet gears 3 rotatably arranged at the planet carrier 2, and a sun gear 4 and a ring gear 5. In the present case, three planet gears 3 mesh with the sun gear 4 and the ring gear 5, wherein only one planet gear 3 is represented in the sectioning in FIG. 1. The planet gears 3 are rotatably mounted at the planet carrier 2 via planetary gear pins (not represented in greater detail). The sun gear 4 is rotationally fixed to a first shaft W1, and the planet carrier 2 is rotationally fixed to a second shaft W2.

The planet carrier 2 includes three pin-shaped connecting elements 6, which are axially displaceable therein, wherein only one connecting element 6 is represented in the sectioning in FIG. 1 and FIG. 2. The connecting elements 6 are connected, on a first side of the planet carrier 2, to the actuator 7 via a disk 14, via a sliding sleeve 15, and via a selector fork 16. In the present case, the particular connecting element 6 is form-lockingly accommodated in a particular recess 17 at the disk 14. The disk 14 is curved in the shape of a cup and comes to rest against the sliding sleeve 15. The selector fork 16 operatively connected to the actuator 7 form-lockingly engages into the sliding sleeve 15 in order to axially displace the sliding sleeve 15 in accordance with the actuator 7. The actuator 7 is merely represented in a highly simplified manner in FIG. 2 and is configured for being electromagnetically actuated. The connecting elements 6 and the planet gears 3 are arranged at the planet carrier 2 in alternation in the circumferential direction. In other words, one planet gear 3 is arranged between every two connecting elements 6.

On a second side of the planet carrier 2, the connecting elements 6 are connected to a ring-shaped first dog element 8. As is particularly well apparent from FIG. 1 and FIG. 2, the second side of the planet carrier 2 opposite the first side of the planet carrier 2 is not accessible from the outside. In the present case, all connecting elements 6 are connected to the first dog element 8 via a common snap ring 18, wherein a bore hole 19 for the passage and connection of the particular connecting element 6 is formed in the dog element 8 for each connecting element 6. The first dog element 8 includes an external toothing 12, which engages and is axially guided in an internal toothing 13 of the planet carrier 2 in order to enable an axial displacement of the first dog element 8 and simultaneously prevent a rotation of the first dog element 8. Moreover, the first dog element 8 includes an internal toothing 9, which, in a first shift position, is form-lockingly connectable to a toothing 10a at a second dog element 10 and, in a second shift position, is form-lockingly connectable to a toothing 11a at a third dog element 11. The second dog element 10 is rotationally fixed to a third shaft W3. The third dog element 11 is rotationally fixed to the ring gear 5. The three shafts W1, W2, W3 are arranged coaxially to one another and rotate about a common axis of rotation A.

Figure 5:
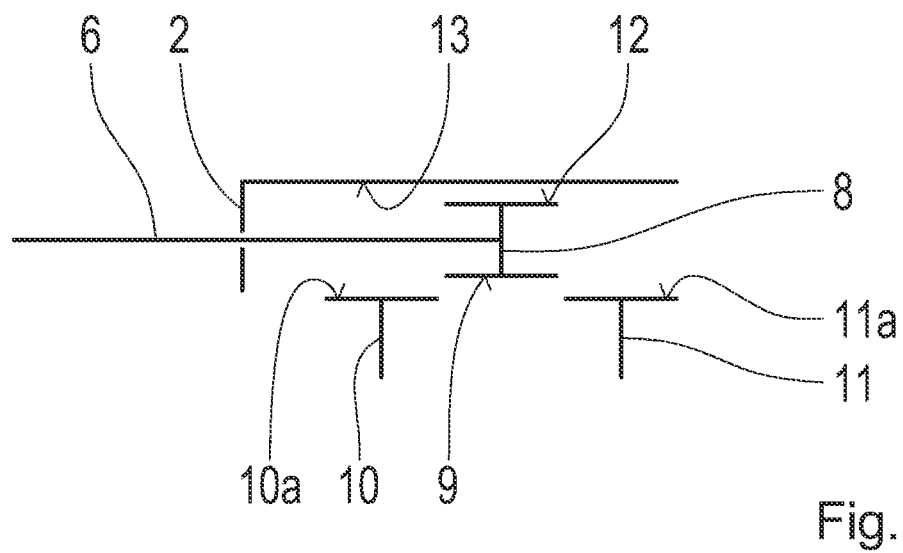
FIG. 5 shows a highly simplified schematic of a third shift position of the first dog element of the planetary transmission according to example aspects of the invention.

In FIG. 1, FIG. 2, and FIG. 5, the first dog element 8 is represented in a third shift position, wherein the first dog element 8, in the third shift position, is decoupled from the second dog element 10 and the third dog element 11. The first dog element 8 is displaced, by an actuator actuation, between the three shift positions due to an axial displacement of the connecting elements 6 in the planet carrier 2. The third shift position of the first dog element 8 is an intermediate position, wherein the third shift position is arranged axially between the first shift position and the second shift position. Consequently, the first dog element 8, in the third shift position, is in mesh neither with the first toothing 10a nor with the second toothing 11a and, thereby, is decoupled from the second dog element 10 and the third dog element 11.

Figure 3:
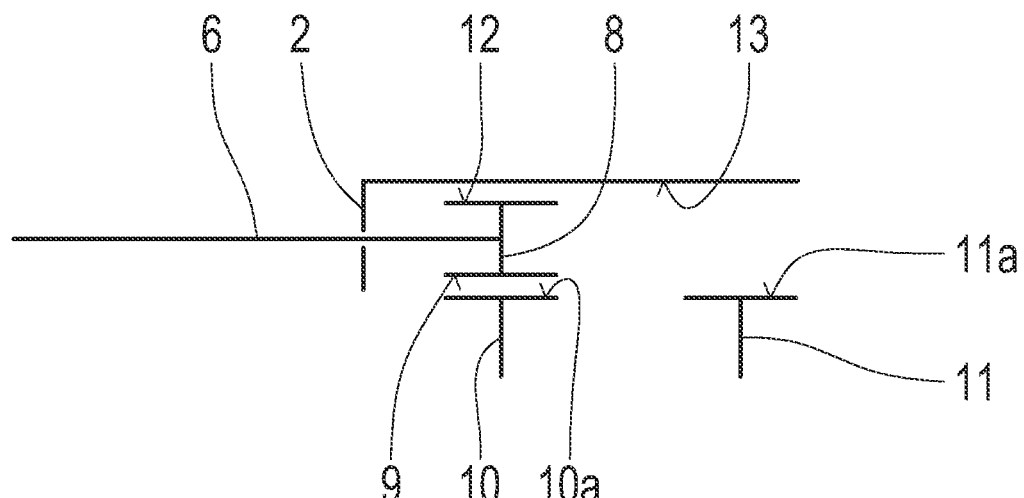
FIG. 3 shows a highly simplified schematic of a first shift position of a first dog element of the planetary transmission according to example aspects of the invention.
Figure 4:
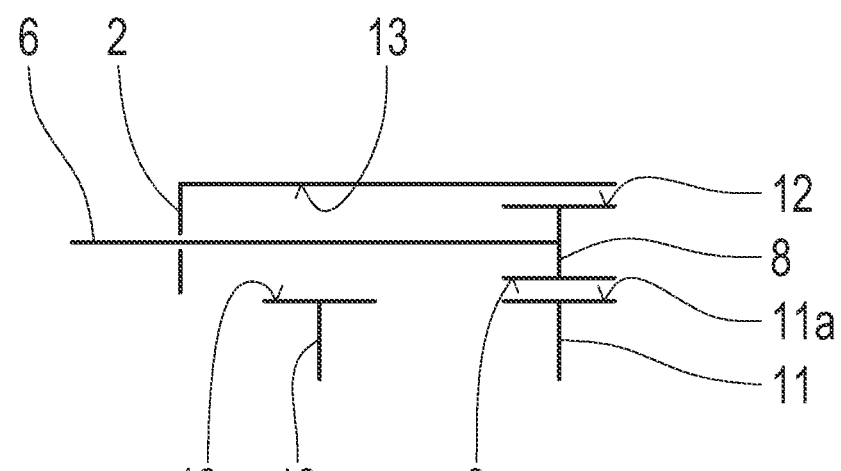
FIG. 4 shows a highly simplified schematic of a second shift position of the first dog element of the planetary transmission according to example aspects of the invention.

FIG. 3, FIG. 4, and FIG. 5 each show a detail of the planetary transmission 1 according to FIG. 1 and FIG. 2 in a highly simplified manner, wherein FIG. 3 shows the first dog element 8 in the first shift position, wherein, furthermore, FIG. 4 shows the first dog element 8 in the second shift position, and wherein FIG. 5 shows the first dog element 8 in the third shift position.

According to FIG. 3, the internal toothing 9 of the first dog element 8 is form-lockingly connected, in the first shift position, to the toothing 10a at the second dog element 10.

According to FIG. 4, the internal toothing 9 of the first dog element 8 is form-lockingly connected, in the second shift position, to the toothing 11a at the third dog element 11.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 planetary transmission
2 planet carrier
3 planet gear
4 sun gear
5 ring gear
6 connecting element
7 actuator
8 first dog element
9 internal toothing at the first dog element
10 second dog element
10a toothing at the second dog element
11 third dog element
11a toothing at the third dog element
12 external toothing at the first dog element
13 internal toothing at the planet carrier
14 disk
15 gear shift sleeve
16 selector fork
17 recess
18 snap ring
19 bore hole
A axis of rotation
W1 first shaft
W2 second shaft
W3 third shaft

The invention claimed is:

1. A shiftable planetary transmission (1), comprising:
a planet carrier (2), a plurality of planet gears (3), a sun gear (4), and a ring gear (5), the sun gear (4) and the ring gear (5) meshed with the planet gears (3), the plurality of planet gears (3) rotatably arranged on planetary gear pins of the planet carrier (2),
wherein the planet carrier (2) comprises at least one connecting element (6) that is axially displaceable within the planet carrier (2), the at least one connecting element (6) separate from the planetary gear pins of the planet carrier (2),
wherein the at least one connecting element (6), on a first side of the planet carrier (2), is at least indirectly connected to an actuator (7) and, on a second side of the planet carrier (2), is at least indirectly connected to a first dog element (8),
wherein the first dog element (8) is displaceable, by an actuation of the actuator (7), between a first shift position and at least a second shift position due to an axial displacement of the at least one connecting element (6) in the planet carrier (2).

2. The planetary transmission (1) of claim 1, wherein the first dog element (8) is ring-shaped.

3. The planetary transmission (1) of claim 1, wherein:
the first dog element (8) comprises an internal toothing (9); and
the internal toothing (9) of the first dog element (8), in the first shift position, is form-lockingly connected to a toothing (10a) at a second dog element (10) and, in the second shift position, is form-lockingly connected to a toothing (11a) at a third dog element (11).

4. The planetary transmission (1) of claim 3, wherein the second dog element (10) or the third dog element (11) is rotationally fixed to the sun gear (4) or to the ring gear (5).

5. The planetary transmission (1) of claim 1, wherein the at least one connecting element (6) comprises a plurality of connecting elements (6) accommodated at the planet carrier (2), each of the connecting elements (6) is arranged circumferentially between a respective pair of planet gears (3) at the planet carrier (2).

6. The planetary transmission (1) of claim 1, wherein the at least one connecting element (6) is connected on the first side of the planet carrier (2) to a disk (14), and the disk (14) is indirectly connected to the actuator (7) via a sliding sleeve (15) and a selector fork (16).

7. The planetary transmission (1) of claim 1, wherein the at least one connecting element (6) is form-lockingly arranged at the first dog element (8) via a snap ring (18).

8. The planetary transmission (1) of claim 1, wherein the actuator (7) is electromechanically actuatable.

9. The planetary transmission (1) of claim 1, wherein the at least one connecting element (6) is pin-shaped.

10. A shiftable planetary transmission (1), comprising:
a planet carrier (2), a plurality of planet gears (3) rotatably arranged at the planet carrier (2), a sun gear (4), and a ring gear (5), the sun gear (4) and the ring gear (5) meshed with the planet gears (3),
wherein the planet carrier (2) comprises at least one connecting element (6) that is axially displaceable within the planet carrier (2),
wherein the at least one connecting element (6), on a first side of the planet carrier (2), is at least indirectly connected to an actuator (7) and, on a second side of the planet carrier (2), is at least indirectly connected to a first dog element (8),
wherein the first dog element (8) is displaceable, by an actuation of the actuator (7), between a first shift position and at least a second shift position due to an axial displacement of the at least one connecting element (6) in the planet carrier (2),
wherein the first dog element (8) comprises an internal toothing (9),
wherein the internal toothing (9) of the first dog element (8), in the first shift position, is form-lockingly connected to a toothing (10*a*) at a second dog element (10) and, in the second shift position, is form-lockingly connected to a toothing (11*a*) at a third dog element (11), and
wherein the first dog element (8) is decoupled from the second dog element (10) and the third dog element (11) in a third shift position.

11. The planetary transmission (1) of claim 10, wherein the third shift position is arranged axially between the first shift position and the second shift position.

12. A shiftable planetary transmission (1), comprising:
a planet carrier (2), a plurality of planet gears (3) rotatably arranged at the planet carrier (2), a sun gear (4), and a ring gear (5), the sun gear (4) and the ring gear (5) meshed with the planet gears (3),
wherein the planet carrier (2) comprises at least one connecting element (6) that is axially displaceable within the planet carrier (2),
wherein the at least one connecting element (6), on a first side of the planet carrier (2), is at least indirectly connected to an actuator (7) and, on a second side of the planet carrier (2), is at least indirectly connected to a first dog element (8),
wherein the first dog element (8) is displaceable, by an actuation of the actuator (7), between a first shift position and at least a second shift position due to an axial displacement of the at least one connecting element (6) in the planet carrier (2),
wherein the first dog element (8) comprises an external toothing (12) that engages and is axially guided in an internal toothing (13) of the planet carrier (2).

* * * * *